(12) United States Patent
Sévigny

(10) Patent No.: US 6,400,832 B1
(45) Date of Patent: Jun. 4, 2002

(54) PROCESSING IMAGE DATA

(75) Inventor: Benoit Sévigny, Quebec (CA)

(73) Assignee: Discreet Logic Inc., Quebec (CA)

( * ) Notice: Subject to any disclaimer, the term of this patent is extended or adjusted under 35 U.S.C. 154(b) by 0 days.

(21) Appl. No.: 09/068,424
(22) PCT Filed: Sep. 9, 1997
(86) PCT No.: PCT/IB97/01082
§ 371 (c)(1),
(2), (4) Date: Apr. 26, 1999
(87) PCT Pub. No.: WO98/07979
PCT Pub. Date: Mar. 19, 1998

(30) Foreign Application Priority Data

Sep. 12, 1996 (GB) ............................................. 9619128

(51) Int. Cl.$^7$ ................................................. G06K 9/00
(52) U.S. Cl. ..................................................... 382/103
(58) Field of Search ................................ 382/100, 103, 382/104, 107, 236, 509; 348/14.15, 415.1, 416.1, 417.1, 418.1, 439.1, 702, 715, 905; 345/473, 474, 619, 620, 621, 623, 624, 629, 635, 640, 672, 700, 704, 723, 949, 960; 472/60, 61

(56) References Cited

U.S. PATENT DOCUMENTS

| | | | |
|---|---|---|---|
| 4,903,700 A | | 2/1990 | Ishii et al. ..................... 607/13 |
| 5,077,610 A | * | 12/1991 | Searby et al. ................ 348/593 |
| 5,404,316 A | * | 4/1995 | Klingler et al. .............. 345/723 |
| 5,459,529 A | * | 10/1995 | Searby et al. ................ 348/586 |
| 5,923,791 A | * | 7/1999 | Hanna et al. ................ 382/295 |
| 5,999,173 A | * | 12/1999 | Ubillos ........................ 345/724 |

FOREIGN PATENT DOCUMENTS

| | | | | |
|---|---|---|---|---|
| EP | 0360576 A1 | 3/1990 | .......... | G06F/15/62 |
| EP | 0589658 A2 | 3/1994 | .......... | H04N/5/262 |
| WO | WO 96/07979 | 3/1996 | .......... | G06K/9/20 |
| WO | WO 98/11512 | 3/1998 | .......... | G06T/15/70 |

* cited by examiner

*Primary Examiner*—Andrew W. Johns
*Assistant Examiner*—Shervin Nakhjavan
(74) *Attorney, Agent, or Firm*—Gates & Cooper LLP

(57) ABSTRACT

An object shown in a first clip of image frames is composited with frames of a second clip on a frame-by-frame basis. A track of positions are determined over time which specify a relationship between a point on frames from said first clip in relation to corresponding frames in said second clip. The object is overlaid transparently over corresponding frames of second clip and the positions of said track are modified. Thereafter, the images are composited on the basis of the modified track positions.

10 Claims, 10 Drawing Sheets

PROCESSING IMAGE DATA

TECHNICAL FIELD

The present application relates to processing image data, wherein an object from or shown in a first clip of image frames is composited with the frames of a second clip on a frame by frame basis.

BACKGROUND

Advances in the field of digital signal processing have allowed many new developments to be effected in video and film post production. Many sophisticated image modifications and special effects have become widely accepted as part of post production procedures as a result of the developments of such products as "FLAME", "FLINT RT" and "FIRE",licensed by the present Assignee.

A "clip" of film or video consists of a plurality of image frames which are displayed at frame rate to create the illusion of a moving image. The process of removing an object from a first clip and adding it to a second clip, to create the illusion that the object was always present in the second clip, is generally referred to as compositing.

Many compositing procedures were developed using highly labour-intensive procedures. Consequently, their application has been limited and, recently, a demand has developed for reducing the amount of labour required in order to achieve these effects, so as to make them more widely available.

When objects are moving within a scene, it is often necessary for an added object to exhibit some movement so as to maintain the illusion. A known process for achieving this is to perform a tracking operation upon a selected position within the background image. The tracking information is then used to effect movement of an added object over time, on a frame by frame basis. This approach has many useful applications but problems occur if, for some reason, it is not possible to maintain a track. This occurs, for example, if a tracked location becomes obscured by another object or if the track location extends beyond the image frame.

A display control system is disclosed in U.S. Pat. No. 4,908,700 in which a moving image of an object is successively compounded with a color picture image from an external source, so as to obtain a compounded image in which the resulting image of the object appears to be moving with respect to the color picture image. A display control apparatus includes a register unit for color range selecting data and circuitry for selecting one of first color image data corresponding to signals which are supplied from an external device such as a television camera and second color image data read from video memory. The value of color image data selected by the selection circuit is compared with a value of the color range selecting data stored in the register unit and based on this comparison either the first color image or second color image data is selected. This allows a first moving image to be inserted within a moving scene but the inter-relation between the two image portions is determined exclusively by the automatic selection made by the system, which, particularly at high definitions, may not always be appropriate.

SUMMARY OF THE INVENTION

According to a first aspect of the present invention, there is provided a method of processing image data, wherein an object shown in a first clip of image frames is composited with frames of a second clip on a frame by frame basis, comprising steps of determining a track of positions over time which specify a relationship between a point on frames from said first clip in relation to corresponding frames in said second clip; overlaying said object transparently over corresponding frames of said second clip; modifying the positions of said track; and compositing said images on the basis of said modified track positions.

The invention provides an advantage in that it is possible to make manual modifications to a tracked object. While modifications are being made, the objects to be added is overlaid but the overlaying process renders the object transparent, such that the underlying background can also be viewed. In this way, it is possible to make manual modifications to the track such that, during the final compositing procedure, the added object is positioned as required and thereby maintain the illusion in the output composited clip.

Preferably, tracked positions are determined by making pixel comparisons between adjacent frames. Preferably, an object is overlaid transparently by adjusting blending values.

According to a second aspect of the present invention, there is provided image processing apparatus, configured to display an object from a first clip of image frames composited with frames of a second clip, comprising determining means configured to determine a track of positions over time which specify a relationship between a point on frames from said first clip in relation to corresponding frames in second clip; overlaying means configured to overlay said object transparently over corresponding frames of said second clip; modifying means configured to modify the positions of said track and compositing means configured to composite said images on the basis of said modified track positions.

Preferably, said modifying means includes means to allow modification by manual operation.

DETAILED DESCRIPTION OF A PREFERRED EMBODIMENT

Figure 1:
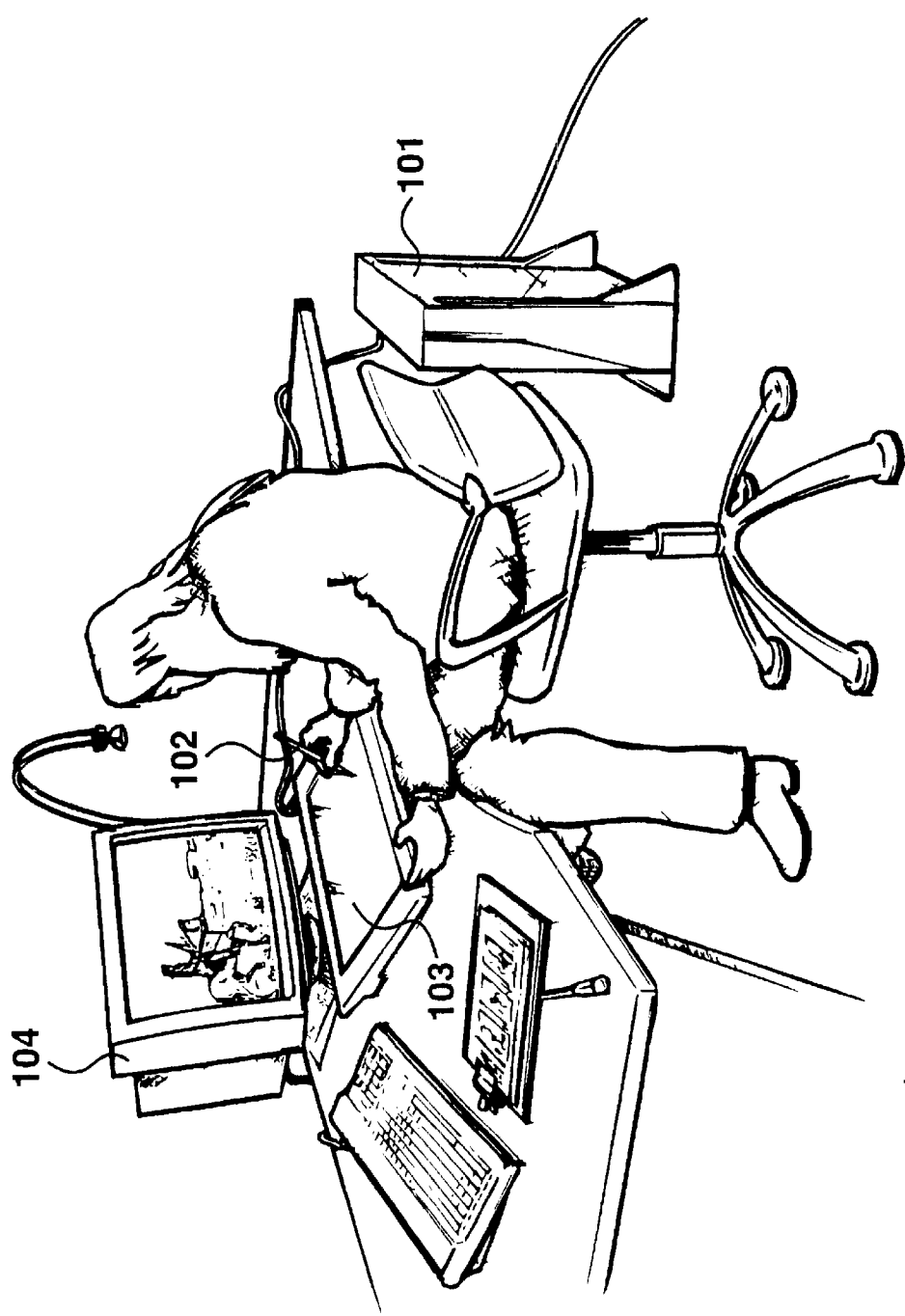
FIG. 1 illustrates a post production facility, including a storage device for video clips, a processing device and a display device for displaying images.

A post production facility is shown in FIG. 1, in which video clips are processed in a processing device 101. The processing of image clips is controlled in response to manual operation of a stylus 102 against a graphics touch tablet 103. Image clips are displayed to a video artist via a display unit 104.

In the present example, image data has been supplied to the processing device 201, by scanning cinematographic film, such that said images may now be manipulated as digital image data. A desert scene is shown and the video artist is required to modify frames within the clip so as to obscure an offending object.

Figure 2:
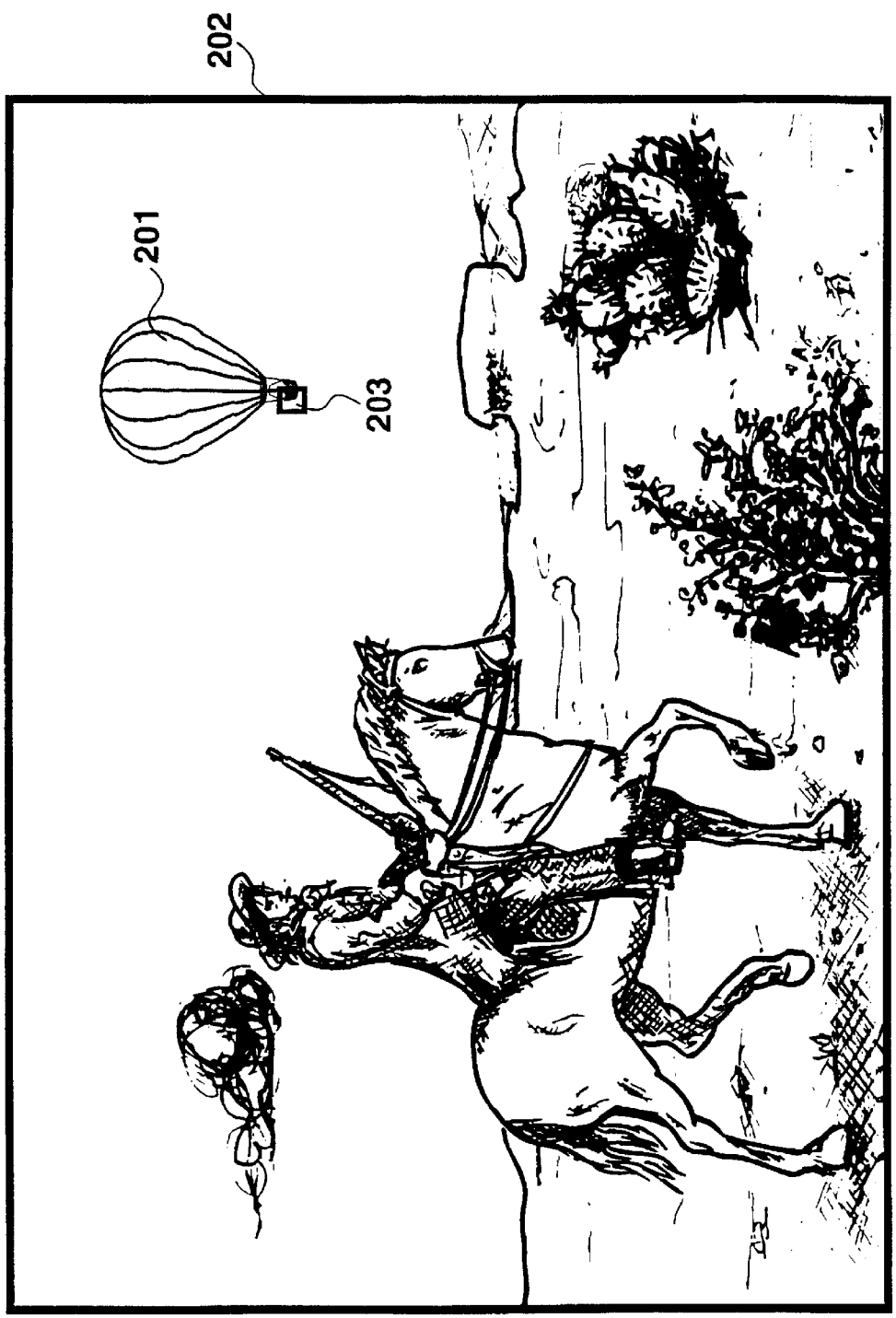
FIG. 2 illustrates an image of the type displayed on the display device shown in FIG. 1, including an undesirable object to be tracked for application of an obscuring object.

The frame shown in FIG. 2 represents a typical frame within a clip to be modified. The frame includes a background object 201 which should not be present in the scene. The object moves relative to the edge of the frame 202 and the artist has decided to apply a tracking process so as to track a specific portion 203 of the object 201 as it moves relative to the frame boundary 202. This is achieved by selecting an appropriate menu button and placing a cursor 203 over the selected location. The foreground object is then applied to the scene and blended against the background at a position which will obscure the offending object 201 on a frame by frame basis. The foreground object has a specified location therein which is configured to follow the track defined by the selected object 203. After applying this track, it may be found that, over a particular region, less than favourable results are obtained. This situation is illustrated in FIG. 3.

A foreground object in the form of a cloud 301 has been made available so as to be in a position to be composited with the background image. Presently, the foreground image and the background image are held in separate storage locations and blending is being performed in real-time such that the two components to the composite image are independently available. Blending between the foreground and background is achieved using control signals often referred to as alpha information. Normally, in most regions, this alpha information is set to its maximum extent or to its minimum extent, with intermediate values only being specified around boundary edges, so as to provide soft blending between components. However, it is possible to modify these alpha values for the image as a whole, so as to show it as having a level of transparency. In this way, it is possible to locate a foreground image relative to a background image, with said background image being seen as transparent behind said foreground image.

Figure 3:
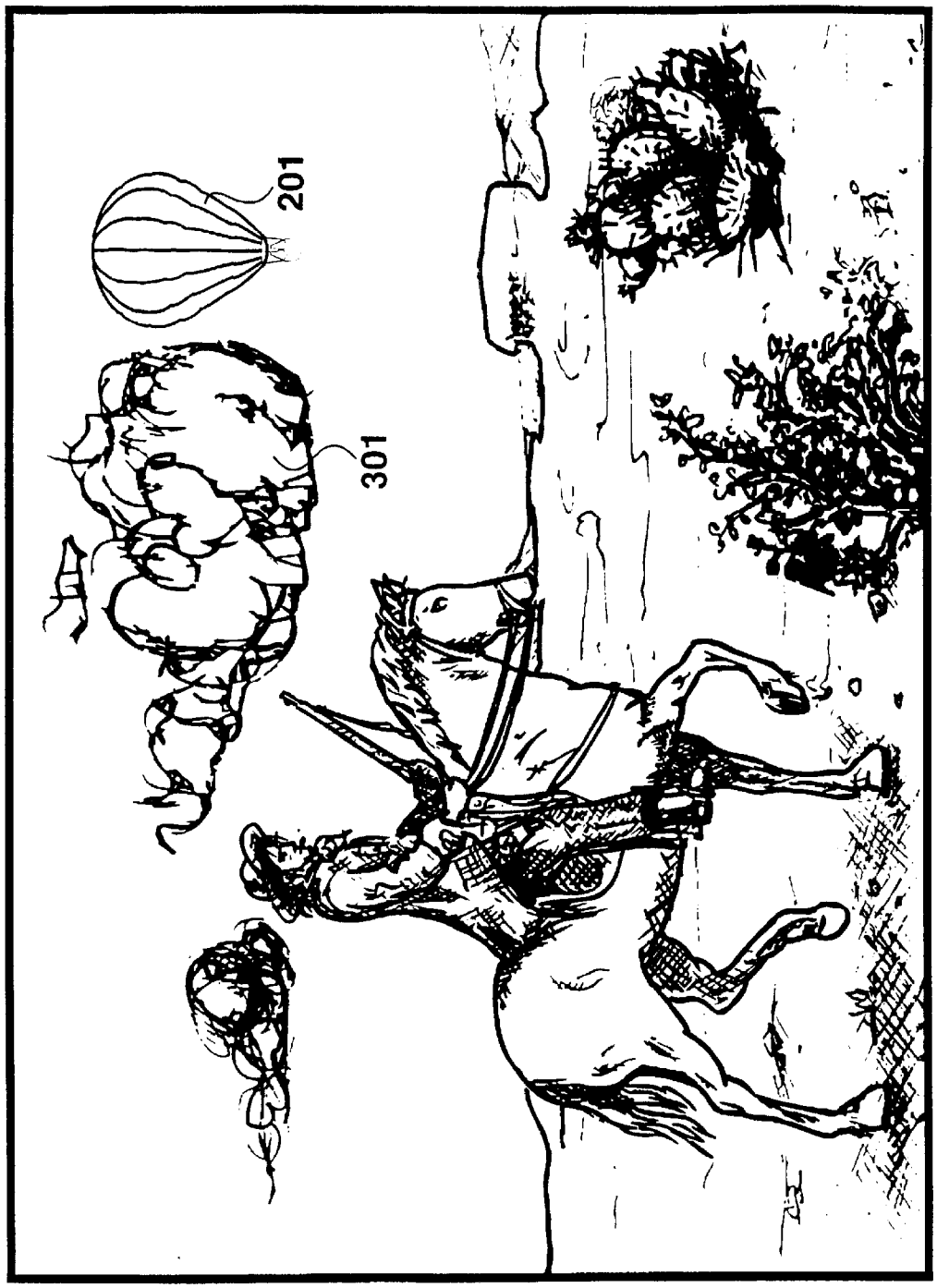
FIG. 3 illustrates the object of FIG. 2 along with a transparent obscuring object.
Figure 4:
FIG. 4 shows the position of a transparent obscuring object after manual modification.

This process is effected with respect to FIG. 3 and as shown in FIG. 3 the new foreground object 301 and the offending background object 201 are now displayed at reduced transparency. It is now possible for the foreground object to be selected and manually moved relative to the object frame. This situation is illustrated in FIG. 4. The foreground object 301 is now located, manually, to a position where it totally covers the offending background object 201. Furthermore, it is possible for a particular location within the foreground object to be accurately lined up against a corresponding selected location within the background object. This represents the condition which should have been achieved by the tracking operation but, for whatever reason, failed in the automated routine. Thus, having manually adjusted the position of the track locations, the track itself may be modified so as to bring the whole locus of track points into line with their idealized locations.

Figure 5:
FIG. 5 shows a modified object after manually being modified, after the removal of transparency.

After the foreground object has been moved relative to the background object in its transparent mode, the tracking procedure may be implemented again, resulting in a non-transparent foreground object fully occluding an offending background object as shown in FIG. 5. Thus, the foreground object added to FIG. 5 will now carefully track the offending background object so at to ensure that said background object remains occluded for the entirety of the clip.

Figure 6:
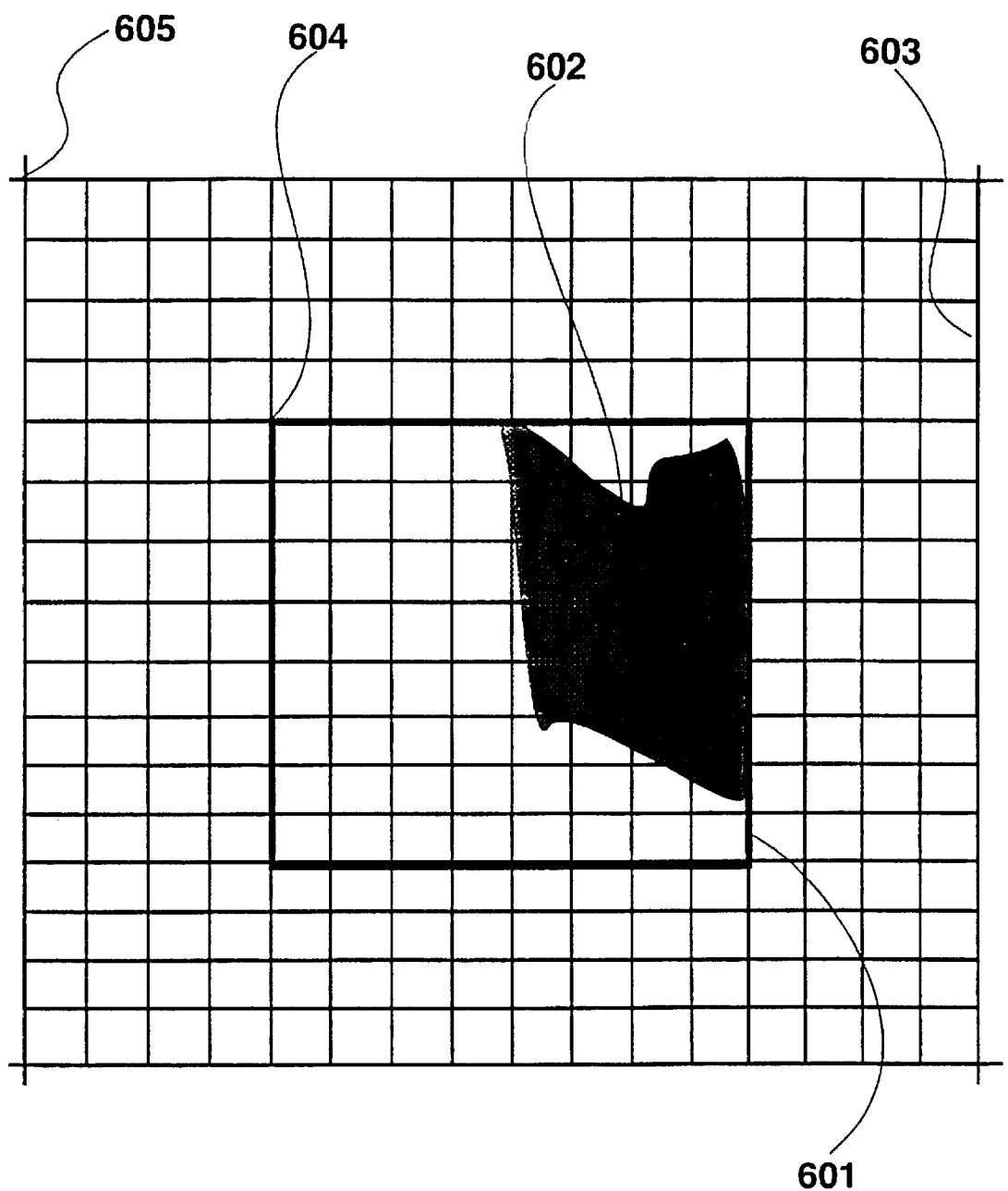
FIG. 6 illustrates a portion of an image processed for tracking purposes.

The tracking operation is effected by identifying a particular region within the image frame. FIG. 6 shows an enlarged portion within the region to be tracked. In response to making an appropriate selection from a displayed menu, a tracking box 601 is displayed which is located, in response to operation of the stylus 202, over a position within the image where a distinct transition occurs. This is identified in FIG. 6 by image 602 located within box 601.

On initiating the tracking procedure, values within box 301 are retained in memory such that on the next frame, comparisons can be made to determine how image 602 has moved within the frame. Box 601 in this example consists of an array of 8×8 pixels and is considered as being centrally located within a search area of 16×16 pixels 603. Thus, the first pixel of box 601 may be identified as 604 and the first pixel of box 603 may be identified as 605.

After storing pixel data for the first frame, consisting of box 601, box 601 of the first frame is compared against box 603 of the next frame. Pixel position 604 is compared with pixel position 605 and for each pixel location within box 601 a comparison is made between equivalent pixel locations. Thus, the value of pixel 604 will be compared with the value of pixel 605. Similarly, all other equivalent pixels within the 8×8 box will be compared with their equivalent locations within box 603.

Once these comparison values have been calculated, box 601 is advanced one pixel position to the left. A similar comparison is then made resulting in a further 8×8 pixel difference values being calculated. The procedure is then repeated, with a further movement to the left and so on until box 601 has been located at all possible positions within box 603 and comparison values have been calculated for all corresponding pixel locations.

The comparison values for each possible location of box 601 within region 603 are compared and as a result of this comparison it is possible to determine a best match for box 601 of the first frame with all possible positions within box 603 of the second frame. The best possible match is then assumed to be a result of object 602 moving within the frame and from this information it is possible to deduce a movement vector.

A movement vector is stored and the procedure is repeated for the next frame within the clip. Thus, as a result of the movement vector calculated when comparing box 601 with region 603, it is possible to relocate box 601 within the second frame of the clip. This re-positioned box 601 is then considered against a similar surrounding region 603 of the third frame. Here it should be noted that box 601 and region 603 are both relocated in response to the movement vector from the previous comparison. Thus, for each frame transition it is possible to calculate a movement vector so as to effectively track image 602 throughout the entire clip.

Figure 7:
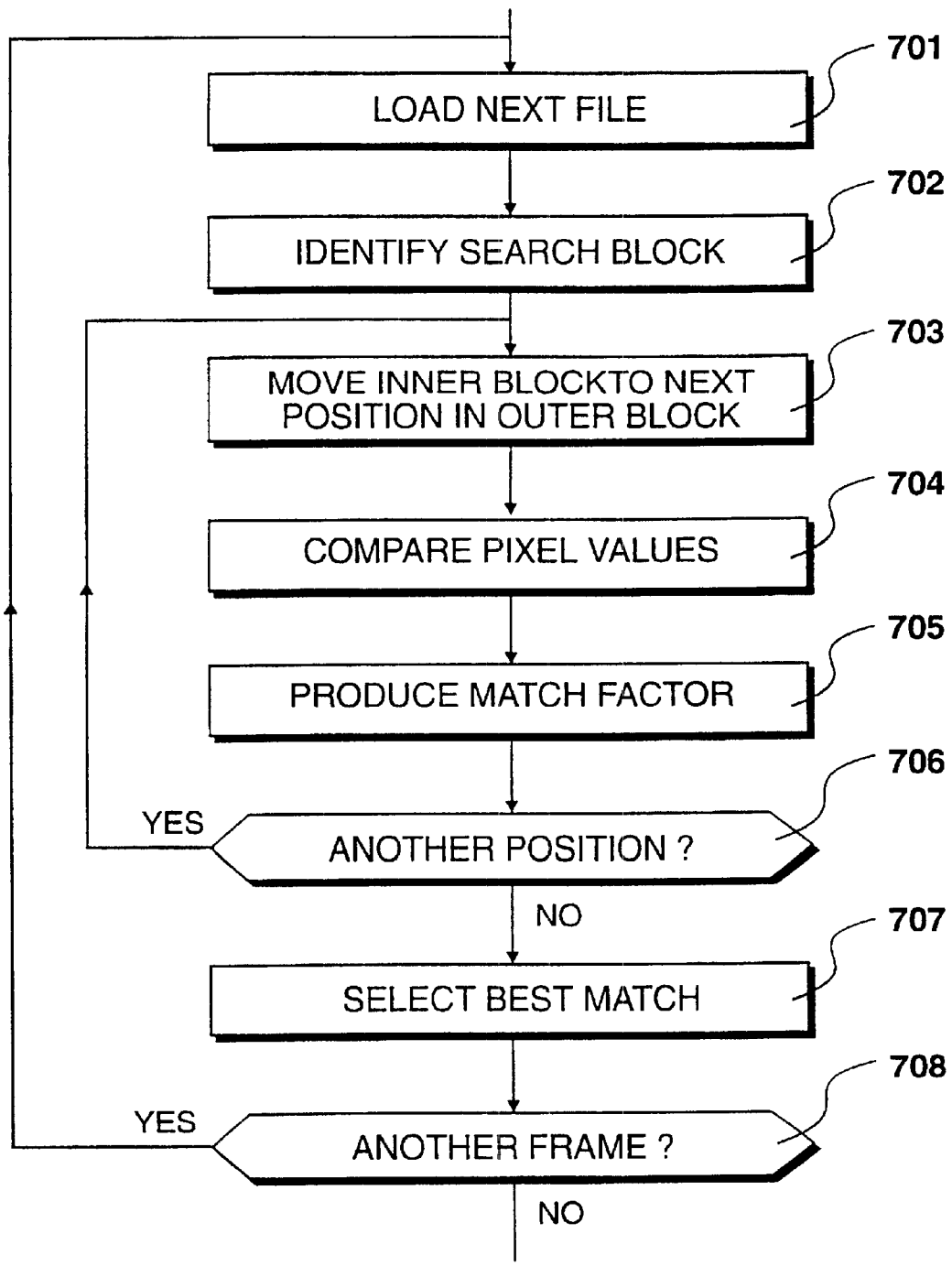
FIG. 7 shows a tracking process performed by the processing device shown in FIG. 1.

Processes performed by processing device 101, in order to generate a track, are illustrated in FIG. 7. At step 701 the next frame of a clip is loaded, ie the first frame on the first iteration, and at step 702 a search block is identified.

At step 703 the inner block, block 602 in FIG. 6, is moved to the next position in the outer block 603.

At step 704 pixel values within the inner block are compared against the corresponding pixel values in the outer block. Thereafter, at step 705 match factors are produced for each pixel within the inner block and at step 706 a question is asked as to whether another position within the outer block needs to be considered.

When the question asked at step 706 is answered in the affirmative, control is returned to step 703, resulting in further movement of the inner block to the next position in the outer block. Again comparisons are made of pixel values within the inner block to produce a new match factor for the newly located inner block.

Eventually, all positions will have been considered, resulting in the question asked at step 706 being answered in the negative. Thereafter, at step 707 the best match factor of all the factors calculated at step 705 is selected, thereby generating a movement vector for the adjacent frames. Thereafter, at step 708 a question is asked as to whether another frame is present in the clip and when answered in the affirmative control is returned to step 701.

The process shown in FIG. 7 allows track positions to be determined over time which specify a relationship between a point on frames from the first clip in relation to corresponding frames in the second clip. An object from the first clip may now be overlaid over the second clip in a way which allows it to track movements in the underlying clip on a frame-by-frame basis. However, in order to make manual adjustments to the track, the object is overlaid transparently over corresponding frames of the second clip. Consequently, modifications may be made to positions within the track, whereafter image composition may be effected using the modified track positions.

Figure 8:
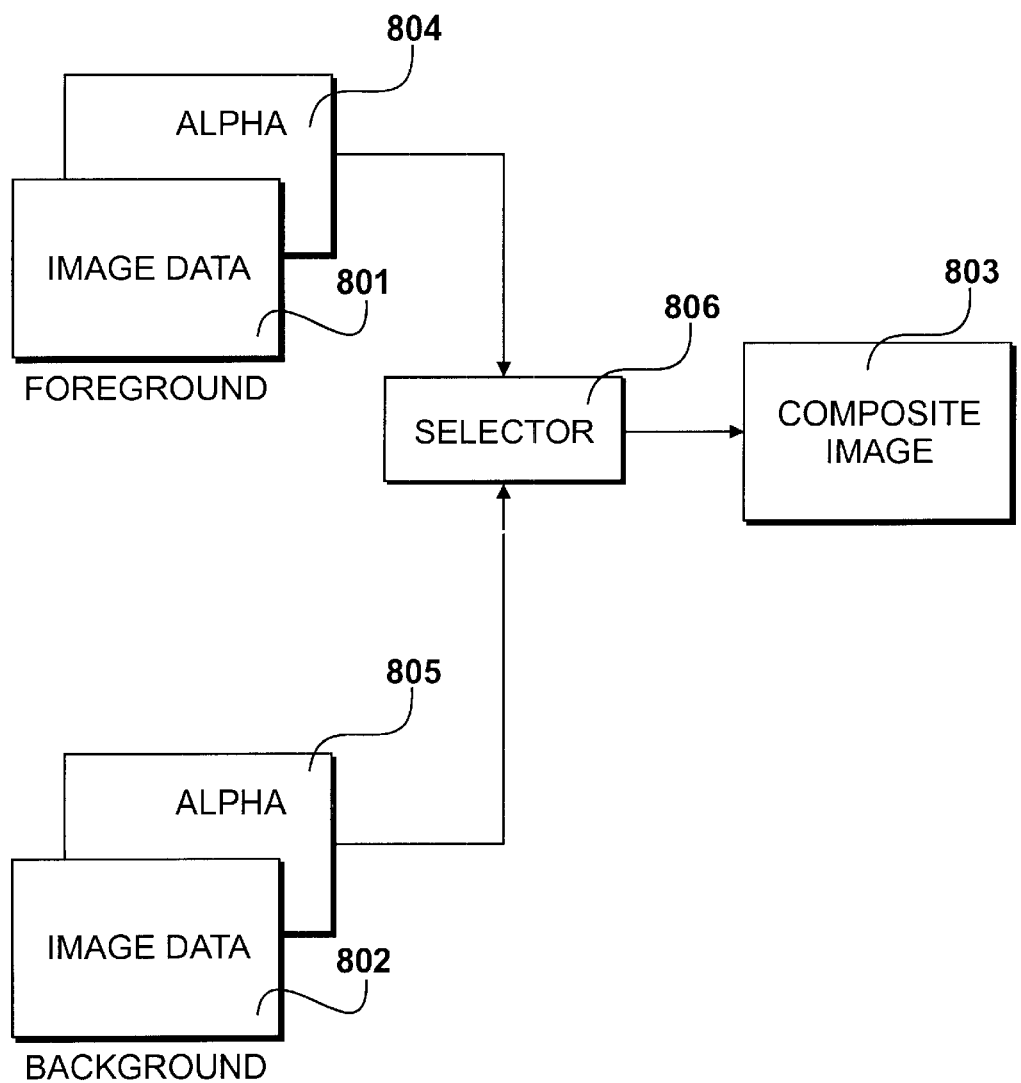
FIG. 8 shows how modifications are made to a track using a transparent foreground object.

System requirements for providing transparent overlaying of objects are illustrated in FIG. 8. Foreground image data may be considered as being retained within a frame store 801. Typically, this frame store will include storage locations to allow the pixel data to be stored as red, green and blue colour components. Similarly, background image data may be stored in a similar frame store 802 and a composite image, supplied to an output frame store 803, may be generated by selecting pixel values from the foreground image data store 801 or from the background image data store 802.

Typically, eight bytes are allocated to each of the red, green and blue colour components and in many systems an additional control plane of eight bytes is provided, thereby allocating a total of 32 bits to each stored location. These additional eight bytes are often identified by differing names, depending upon their particular application. The eight byte control signals are often referred to as an alpha channel and may be considered as providing a further eight bytes of storage, as illustrated by an alpha store 804 for the image data 801, with a similar alpha store 805 for the background image data 802.

The alpha data is used to make a selection between the foreground image and the background image. Alpha data may be selected from store 804 or from store 805, in response to operations of a selector 806. Often, alpha data will be generated from the foreground image so, as shown in FIG. 3, a key or alpha signal is generated to effect blending of a foreground object 301 against the background frame.

In normal compositing procedures, most of the alpha signal will be set to its minimum extent or to its maximum extent, with intermediate values being provided at object edges, so as to provide smooth blending at said edges. If the alpha channel is placed to intermediate values at other locations, blending of foreground and background image results, creating the impression of the foreground image being transparent.

In the present invention, when this transparent mode of operation is required, alpha values in foreground store 804 are modified such that, instead of providing selection between a foreground object or a background, the foreground object is blended with the background throughout its full extent.

The background image store is scanned from top left to bottom right so as to provide a conventional image frame. The foreground image store may be scanned at identical positions synchronously with the background image store, such that the position of objects within the frame remains as originally intended. However, it is possible to offset the scanning of the foreground image data relative to the background image data. Modification of this offset results in a foreground object appearing to move relatively within the background frame. Thus, by modifying alpha values within the foreground data and by adjusting the relative phase of scanning between the foreground data and the background data, it is possible to move a transparent foreground object relatively to the background.

The tracking points may be displayed on an image screen, in addition to the foreground and background images and with said images placed in a transparent mode, it is possible to make modifications to these tracking locations. Thus, a track created by automatic processing as illustrated with reference to FIG. 7, may be adjusted manually, so as to achieve a better result without requiring the whole clip to be manually adjusted.

Figure 9A:
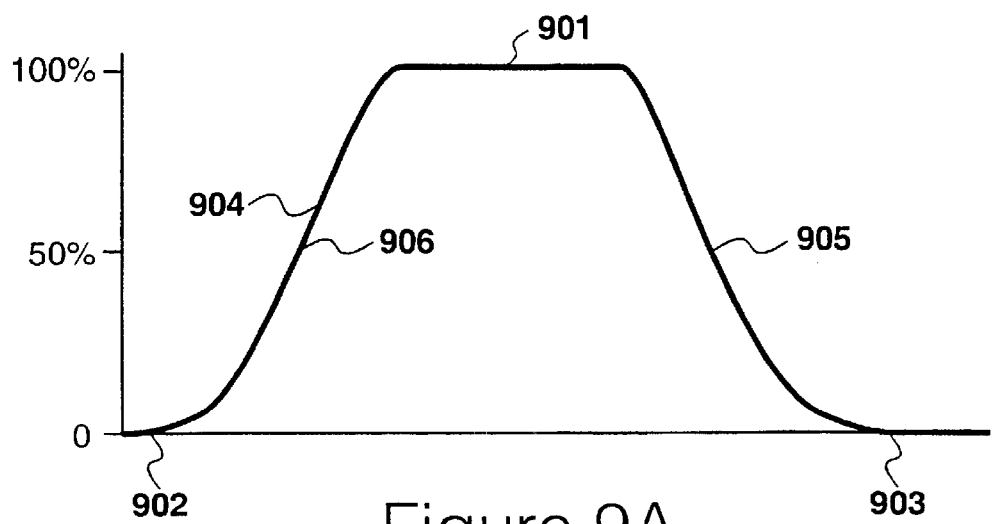
FIG. 9 shows a conventional alpha channel or key signal.

A conventional alpha channel or key signal is illustrated in FIG. 9A in which said signal may have a value ranging from zero to 100%. At 100%, such as at region 901, a foreground object totally obscures background data. Similarly, at regions 902 and 903, where the signal is set at 0%, the foreground object is not seen at all and only the background is seen. Between these two extremes, over regions 904 and 905, a blending occurs and at position 906, the alpha signal is at 50% therefore the blending between the foreground and the background is substantially equal.

Figure 9B:
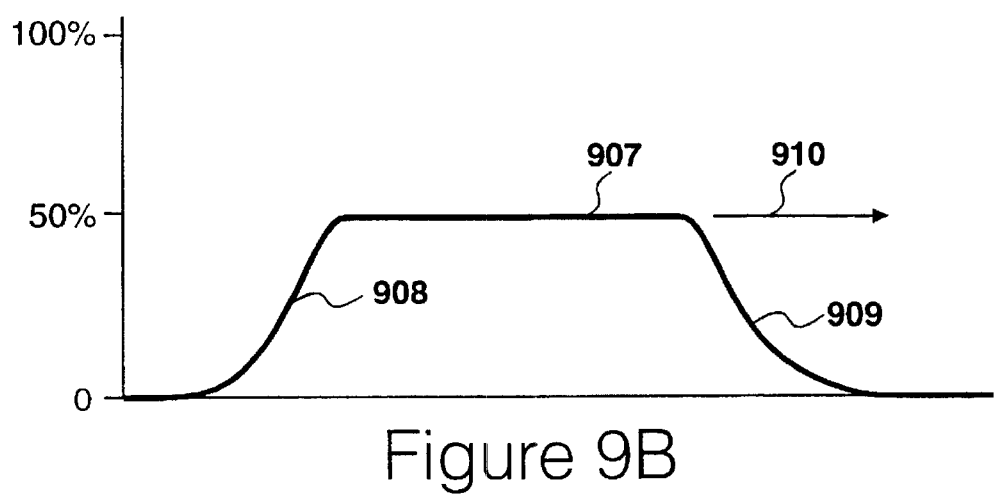

In order to render the foreground object transparent, as required by the present embodiment, the alpha signal is modified as illustrated in FIG. 9B. The alpha signal is effectively clipped such that all values above 50% in FIG. 9A are set to 50%, as illustrated at 907. Thus, regions where the alpha signal is set to zero, background regions, remain substantially the same and at the intersection of foreground and background regions smooth blending occurs via slopes 908 and 909. However, the alpha signal never reaches 100% and is clipped as illustrated at 907. Consequently, all of the foreground object is partially blended with the background object such that the foreground object appears substantially transparent.

Figure 9C:
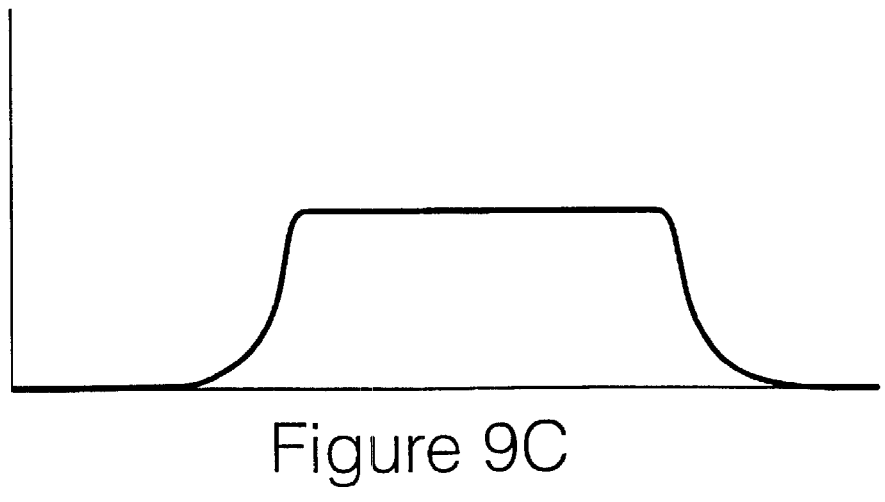

In order to effect the required level of tracking, it is possible to move the foreground object along with its associated alpha channel. A movement of this type may take place as illustrated by arrow 910 to produce a displaced key signal as illustrated in FIG. 9C. Thus, horizontal movement of the object results in the key signal being substantially displaced along a scan line of the video signal. Similarly, vertical movement may result in the exchanging of scan lines. Furthermore, by providing suitable two-dimensional filtering, it is possible to effect movements at sub-pixel definition, all of which results in modifications to alpha signals reflecting similar movements to the displayed objects.

Figure 10:
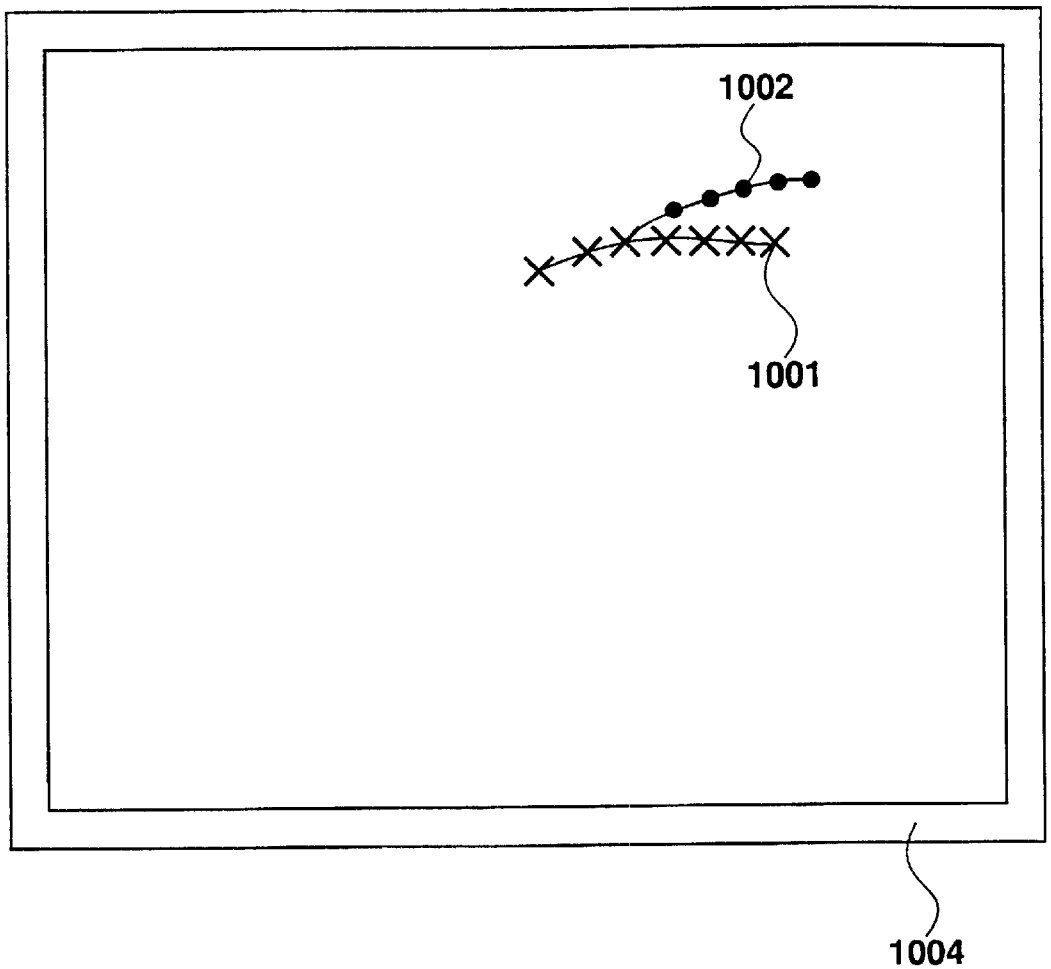
FIG. 10 shows the display of an automated track and the manually modified track of the invention.

A track may be displayed on a visual display monitor 104 as illustrated in FIG. 10. An automated tracking procedure may result in the generation of a plurality of tracking points illustrated by crosses 1001. However, it is possible that this track does not provide optimum results and, by effecting the procedures of the present invention, it is possible to modify the tracking points to positions identified by dots 1002. This new track is then adopted as the tracking line, resulting in the desired effect being realised as the introduced foreground object tracks a background object within the video clip.

What is claimed is:

1. A method of processing image data, wherein an object shown in a first clip of image frames is composited with frames of a second clip on a frame by frame basis, comprising steps of determining a track of positions over time which specify a relationship between a point on frames from said first clip in relation to corresponding frames in said second clip;

overlaying said object transparently over corresponding frames of said second clip;

modifying the positions of said track; and compositing said images on the basis of said modified track positions.

2. A method of processing image data according to claim 1, wherein tracked positions are determined by making pixel comparisons between adjacent frames.

3. A method according to claim 1, wherein an object is overlaid transparently by adjusting blending values.

4. A method according to claim 1, wherein the positions of said track are modified by manual operation.

5. Image processing apparatus, configured to display an object from a first clip of image frames composited with frames of a second clip, comprising determining means configured to determine a track of positions over time which specify a relationship between a point on frames from said first clip in relation to corresponding frames in a second clip;

overlaying means configured to overlay said object transparently over corresponding frames of said second clip;

modifying means configured to modify the positions of said track; and compositing means configured to composite said images on the basis of said modified track positions.

6. Apparatus according to claim 5, wherein said determining means is configured to make pixel comparisons between adjacent frames.

7. Apparatus according to claim 5, wherein said overlaying means is configured to overlay an object transparently by adjusting blending values.

8. Apparatus according to claim 5, wherein said modifying means is configured to facilitate modification of track positions by manual operation.

9. A method of processing image data, wherein an object shown in a first clip of image frames is composited with frames of a second clip on a frame by frame basis; comprising:

automatically determining a track of positions over time that specify a relationship between a point on frames from said first clip in relation to corresponding frames in said second clip;

overlaying said object transparently over corresponding frames of said second clip;

manually modifying the positions of said track; and automatically and finally compositing said images on the basis of said manually modified track positions.

10. Image processing apparatus, configured to display an object from a first clip of image frames composited with frames of a second clip, comprising:

determining means configured to automatically determine a track of positions over time that specify a relationship between a point on frames from said first clip in relation to corresponding frames in a second clip;

overlaying means configured to overlay said object transparently over corresponding frames of said second clip;

modifying means configured to manually modify the positions of said track; and compositing means configured to automatically and finally composite said images on the basis of said modified track positions.

* * * * *